April 6, 1965      K. W. FOSTER      3,176,514

METER COMPENSATING SYSTEM

Filed June 12, 1961      2 Sheets-Sheet 1

INVENTOR:
KENNETH W. FOSTER

BY:
HIS ATTORNEY

April 6, 1965
K. W. FOSTER
3,176,514
METER COMPENSATING SYSTEM
Filed June 12, 1961
2 Sheets-Sheet 2
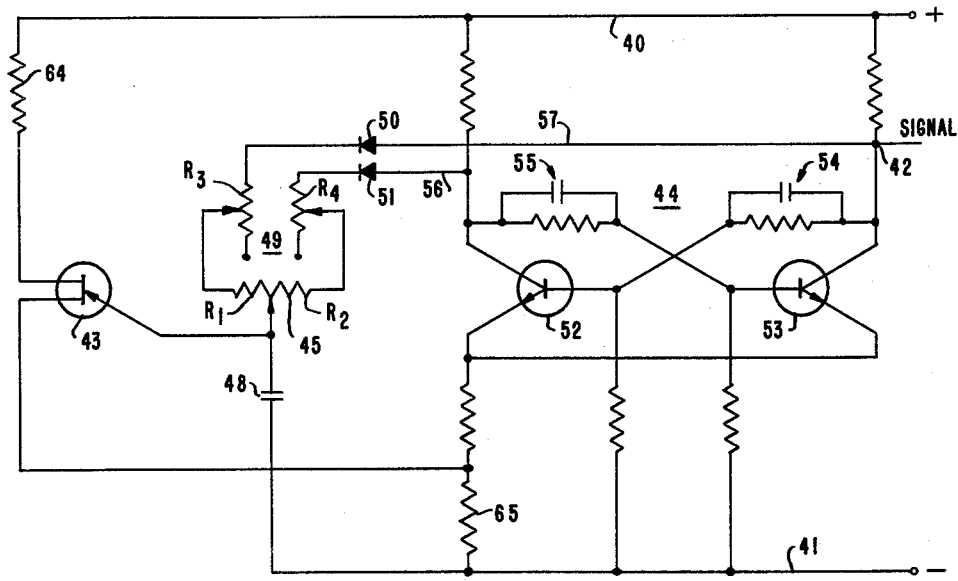
FIG. 3
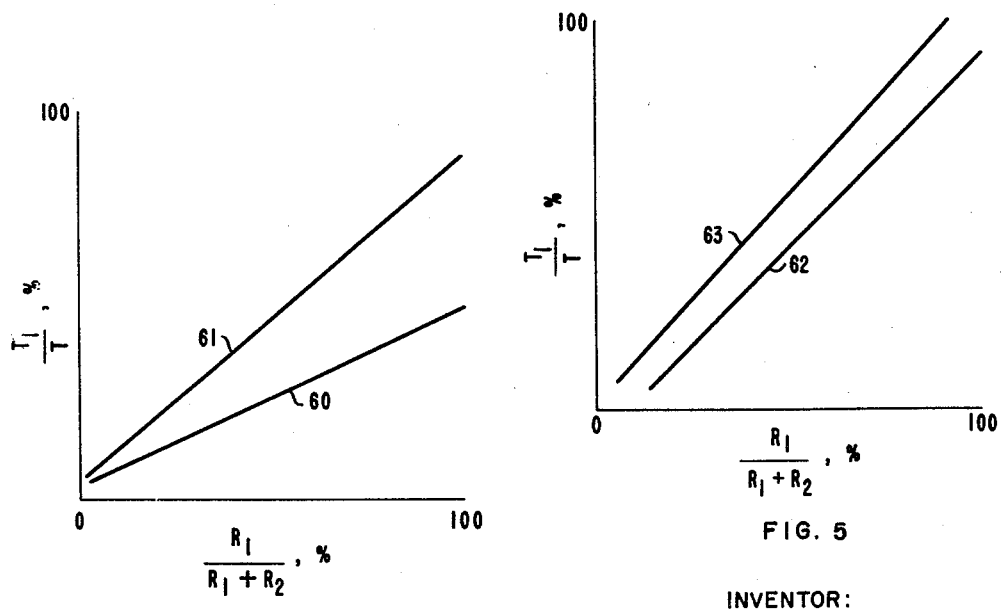
FIG. 4
FIG. 5
INVENTOR:
KENNETH W. FOSTER
BY: *Theodore E. Bieber*
HIS ATTORNEY

United States Patent Office 3,176,514
Patented Apr. 6, 1965

3,176,514
METER COMPENSATING SYSTEM
Kenneth W. Foster, Houston, Tex., assignor to Shell Oil Company, New York, N.Y., a corporation of Delaware
Filed June 12, 1961, Ser. No. 116,360
8 Claims. (Cl. 73—229)

This invention relates to fluid flow meters and more particularly to a means for compensating flow meters for the effects of variable magnitude of a condition which affects the volume of the fluid.

Most fluids whose quantity or volume is measured by flow meter means have characteristics which vary and thus affect the volume of the fluid that is measured by the flow meter. For example, as the temperature and pressure varies, the quantity of gas measured by a flow meter also varies. It is normally required that the flow measured by a flow meter be corrected to a set of standard conditions in order that actual flows through the meter at various times may be compared.

In the past, positive displacement meters which have a rotating shaft output have been compensated by periodically disconnecting the rotating shaft from the totalizing portion of the meter. This disconnection is achieved in one system by monitoring the magnitude of the condition to obtain a signal that is used to control the position of the follower along a variable cam. The variable cam is driven by the rotation of the meter and thus for each revolution of the cam the totalizer is disconnected from the meter during a period controlled by changes in the condition. Thus, the reading of the totalizer portion of the meter will be compensated for changes in the variable condition. While this method is satisfactory for positive displacement meters which have a rotating shaft output, it is entirely unsatisfactory for turbine type meters where there is no rotating shaft output. Furthermore, it would be impossible to have a turbine type meter drive the gear train of a positive displacement meter since the additional load would introduce an error in the flow measured by the turbine meter.

From the above it is seen that while positive displacement meters are compensated for the changes in a variable condition of the fluid the compensating system requires a rotating shaft drive. The shaft of course has a stuffing box that involves considerable friction. As a result of the load placed on the meter by the compensating system and stuffing box turbine meters are left uncompensated.

Accordingly, it is the principal object of this invention to provide a unique means for compensating a fluid flow meter for changes in the magnitude of a condition of the fluid which affects the volume of fluid being measured.

A further object of this invention is to provide a compensation system adapted for use with any type of meter that compensates the totalized reading of the meter for changes in the magnitude of a condition which affects the volume of fluid measured.

A further object of this invention is to provide a system for compensating a fluid flow meter in which the rate of flow through the meter is converted to a series of pulses whose rate of occurrence is proportional to the rate of fluid flow. The pulses are supplied to a counting means through a circuit including a switch means that is interrupted in response to the magnitude of the condition for which the flow rate is being compensated.

A still further object of the present invention is to provide a unique switch means having an electronic circuit for controlling a gate circuit with the electronic circuit being responsive to changes in the condition for which the flow rate is being compensated.

At still further object of this invention is to provide a compensating system for a fluid flow meter that is capable of compensating the meter output for changes in the magnitude of two separate conditions and in addition provide a means for correcting the output of the meter for a constant error therein.

The above objects and advantages of this invention are achieved by converting the rate of flow as measured by the flow meter into a series of electrical pulses whose occurrence is directly proportional to the rate of flow. The electrical pulses are supplied to a totalizing means by a circuit that includes a switch means. The switch means is opened and closed in response to the measured magnitude of a condition which affects the absolute volume of flow through the meter. The condition, which for example may be temperature, is measured and converted to a signal that is used to control the switch means.

In one embodiment of this invention, the signal representing changes in the magnitude of the condition is used to control a portion of the cycle of a unique bi-stable multi-vibrator. The overall time cycle of the multi-vibrator is fixed but the length that each section conducts can be varied and thus used to vary the opening and closing of the gate circuit. The gate circuit in turn is disposed in the coupling between the meter and the pulse totalizing circuit.

In the second embodiment of this invention, the changes in the measured condition are used to position a follower along a variable cam. The variable cam, which is rotated by a constant speed motor, is used to open and close the switch disposed in the circuit coupling the meter to the pulse totalizer.

The above objects and other advantages of this invention will be more easily understood from the following description taken in conjunction with the attached drawings, in which:

FIGURE 3 illustrates a schematic drawing of the multi-vibrator circuit used in FIGURE 1;

FIGURE 4 illustrates the relationship between $$\frac{R_1}{R_1+R_2}$$

of the circuit of FIGURE 3 and the time that each section of the circuit conducts for two different values of $R_4$ with $R_3$ held constant; and, FIGURE 5 illustrates the relation betwen a change in $$\frac{R_1}{R_1+R_2}$$

of FIGURE 3 and the time that each section of the circuit conducts, as $R_3$ and $R_4$ are varied equally and oppositely.

Figure 1:
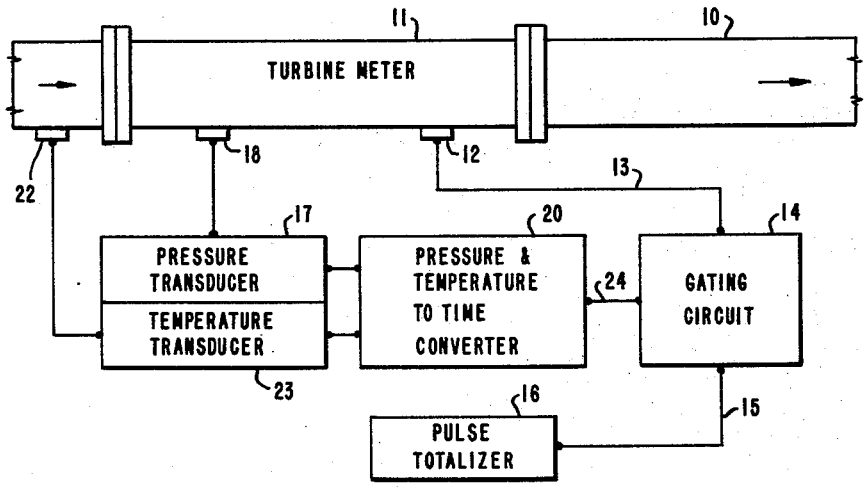
FIGURE 1 illustrates one embodiment utilizing a multi-vibrator circuit to control the gating circuit disposed in the coupling between the flow meter and the pulse totalizer.

Referring now to FIGURE 1, there is shown a pipeline 10 having a meter 11 disposed therein. No specific construction for the meter 11 is shown since many are available and this invention is applicable to all types that have rotating or oscillating parts. The only requirement for the meter 11 is that it be provided with a means located on its movable part which is capable of producing a fixed number of electrical pulses in a transducer 12 for each given movement. This result may be readily accomplished by utilizing a rotor driven by the meter and having notches therein to vary its magnetic reluctance and utilizing a coil for the transducer 12. The transducer 12 is coupled to a gating circuit 14 by means of a circuit 13 with the output side of the gating circuit being coupled to a pulse totalizer 16 by means of a circuit 15.

Other methods than the use of a rotor and a coil may be used for converting the movement of the meter to related electrical pulses. The particular means used will depend upon the meter used to measure the fluid flow. For rotating meters the use of a coil and a rotor provide satisfactory results while in the case of a diaphragm type meter it may be more satisfactory to use the reciprocating motion of the meter to drive a pulse producing means.

A second transducer 17 is shown coupled to a pick-up 18 on the meter housing 11 and is used to detect changes in the pressure of the fluid flowing through the meter. The transducer 17 should be of a design that supplies an electrical signal that is related to the pressure of the fluid. The transducer 17 is coupled to a pressure-to-time converting circuit 20. The pressure-to-time converting circuit may take various forms but it is preferably a multi-vibrator having a fixed frequency of operation with a means for varying the actual period of conduction of each half thereof. A second transducer 23 is shown coupled to a pick-up 22 on the pipeline 10 and is used to detect the temperature of the fluid flowing through the meter 11. The temperature transducer 23 should also provide an electrical signal which is related to the changes in temperature of the fluid passing through the meter 11. The transducer 23 is also connected to the time converting circuit 20, preferably to act in series with the pressure transducer 17. Additional transducers could also be placed in contact with the fluid to correct the volume of fluid for other conditions such as specific gravity, water content and other conditions of the fluid. The output of the time converting circuit 20 is coupled to the gating circuit 14 by means of a circuit 24. The time converter 20 should be coupled to the gating circuit 14 in a manner to control the opening and closing of the gating circuit 14.

When the embodiment of FIGURE 1 is operated, the pulses from the transducer 12 will pass to the totalizing circuit 16 whenever the gate circuit 14 is open and will be blocked whenever the gate circuit 14 closes. The pulse totalizer 16 may take various forms such as digital counters or if the pulses have a low frequency a mechanical counter may be adapted to receive pulses and count them. The signal representing the measured magnitudes of the temperature, pressure or other condition of the fluid flowing in the pipeline 10 are used to control the operation of a time converting circuit 20. As explained above, the circuit 20 may be a multi-vibrator whose overall period of operation remains fixed but whose individual periods of conduction may be varied. In this manner, the gate may be open when one-half of the multi-vibrator conducts and closed when the other half conducts. Thus, by varying the time period of one-half of the multi-vibrator the time that the gate is open and closed may be varied accordingly. The exact construction of the circuit 20 will be described in greater detail below with reference to FIGURE 3. By varying the time that the gate circuit 14 is open and closed while maintaining the period for one cycle of operation, i.e., the opening and closing of the gate circuit 14 constant, one can easily compensate for changes in the temperature, pressure or other condition of the fluid flowing in the pipeline 10, thus permitting the totalizer 16 to give an indication of the flow of liquid corrected to standard conditions.

Figure 2:
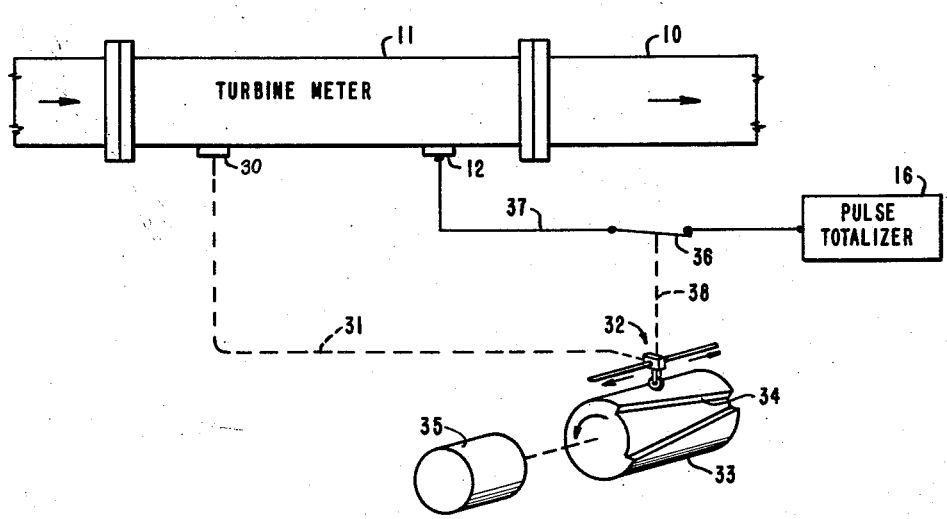
FIGURE 2 illustrates a second embodiment of this invention in which a variable cam driven by a constant speed motor is used to control the opening and closing of the switch disposed betwen the flow meter and the pulse totalizer.

Referring to FIGURE 2, there is shown a second embodiment of this invention similar to that shown in FIGURE 1. The elements shown in FIGURE 2 that are identical to the elements shown in FIGURE 1 bear the identical numerals. Thus, it is seen that the transducer 12 is coupled to the pulse totalizer 16 by means of a circuit 37 which has a switch 36 disposed therein. A transducer 30 is disposed on the housing of the meter 11 and is used to measure changes in the magnitude of a condition of the fluid flowing in the pipeline 10, for example changes in the pressure of the fluid. The transducer 30 is coupled by means of the circuit 31 to position the follower 32 of a cam 33. The follower 32 is connected to operate the switch 36 by means of a connection shown by the dotted line 38. The cam 33 is a cylindrical cam having a wedge shaped depression 34 formed on the face thereof. Thus, when the cam follower passes the depression 34 it will open the switch 36 and when it rides on the outer surface of the cam it will close the switch 36. The cam 33 is driven by a substantially constant speed motor 35 to maintain a substantially constant time period for a complete cycle of the switch 36. Thus, the complete cycle of operation of the switch 36 will remain constant but the time that it is opened or closed will vary depending upon the position of the follower 32.

When the embodiment of FIGURE 2 is operated the transducer 30 positions the follower 32 along the longitudinal axis of the cam 33. It is easily seen that as the follower 32 moves along the longitudinal axis of the cam the time that the switch 36 is open, during one rotation of the cam, will increase and that the time the switch is closed will decrease. This operation is similar to the opening and closing of the gate circuit 14 of FIGURE 1 by the time converting circuit 20. Accordingly, the embodiment of FIGURE 2 will compensate for changes in the measured condition in the same manner as the circuit of FIGURE 1 compensates for changes in the measured condition. While the same results are obtained the apparatus, of course, are decidedly different, a basically mechanical apparatus being used in FIGURE 2 while a completely electrical system is used in FIGURE 1.

Referring now to FIGURE 3, there is shown a schematic drawing of a multi-vibrator circuit suitable for use in the system shown in FIGURE 1. The multi-vibrator circuit 44 consists of two transistors 52 and 53 with the base of the transistor 52 being coupled to the collector of the transistor 53 through a parallel resistance capacitance network 54. Similarly, the base of the transistor 53 is coupled to the collector of the transistor 52 through a parallel resistance capacitance network 55. The power is supplied from a lead 40 while the lead 41 forms the ground or negative side of the power supply.

A uni-junction transistor 43 is used to supply the trigger pulse to cause the multi-vibrator circuit 44 to operate. One lead from the base of the uni-junction transistor 43 is coupled to the positive side of the power supply through a resistance 64 and the other lead to the negative side through resistance 65. The control side of the uni-junction transistor 43 is coupled to the collectors of the two transistors 52 and 53 through a series resistance network 49. The series resistance network 49 is formed by the variable resistances $R_1$, $R_2$ and variable resistances $R_3$ and $R_4$ with the voltage of $R_1$ and $R_2$ depending upon the position of the slider on a single resistance or potentiometer 45. This resistance network and capacitance 48 control the firing time of the uni-junction transistor 43, which controls the oscillation of the circuit. In addition, diodes 50 and 51 are disposed in the connections 56 and 57 which couple the resistance circuit to the transistors 52 and 53, respectively. The output signal from the multi-vibrator circuit 44 appears at the point 42 which is coupled to the gating circuit 14 by means of the circuit 24 in FIGURE 1.

When the above circuit is operated by connecting it to a suitable power supply, current will flow from the collector of the transistor, that is, in the off position, through the diode connected to it and through the appropriate part of the resistance network 49 to charge capacitor 48. When the potential applied to the capacitor 48 reaches the breakdown level of the uni-junction transistor 43 it will break down and permit the condenser to discharge through it and resistor 65, thus supplying a pulse to trigger the multi-vibrator circuit 44 to cause the other transistor to conduct and the previously conducting transistor to shut off. Capacitor 48 then charges through the other diode and other portion of resistor network 49 until breakdown potential is again reached at which time the uni-junction transistor 43 again breaks down and the capacitor 48 discharges through the uni-junction transistor 43 and resistor 65, pulsing the circuit and causing it to charge the transistor which is conducting. As can be seen, the charging time of the capacitor 48 can be varied by varying the value of the resistances $R_1$, $R_2$, $R_3$ and $R_4$. Resistor 45 is a constant and a change in the position of the slider of resistance 45 results in an increase in the portion of this resistance disposed in the charging circuit from one transistor and an equal reduction in the resistance disposed in the charging circuit of the other transistor. Thus, the period that each of the transistors 52 and 53 conduct may be changed while the overall period of operation of the multi-vibrator 44 remains substantially fixed. The resistances $R_3$ and $R_4$ may be changed individually or may be changed equal amounts in the same direction or equal amounts in the opposite direction. Accordingly, the signals from the transducers 17 and 23 of FIGURE 1 are actually a change in the value of resistances $R_1$, $R_2$, $R_3$ and $R_4$. The results of a change in these various resistance value will be more fully explained below with reference to FIGURES 4 and 5. It is sufficient to note at this time that a change in these resistance values varies the period of conduction of each half of the multi-vibrator while maintaining its overall time period essentially constant. As explained with relation to FIGURE 1, if the signal appearing at the point 42, i.e. when the transistor 52 is conducting, is used to control the opening of the gate circuit 14, the number of pulses supplied to the pulse totalizer may be easily controlled by controlling the period of conduction of the transistor 53.

Referring now to FIGURE 4, there is shown the relationship between a change in the position of the slider on resistance 45

$$\left(\frac{R_1}{R_1+R_2}\right)$$

to a change in the value of $$\frac{T_1}{T}$$

for two different values of resistance $R_4$ while resistance $R_3$ is maintained constant. In this relationship $T_1$ denotes the time the gate is open while $T$ denotes the total time period of the multi-vibrator. From the curves 60 and 61 it can be seen that for any given value of resistance 45, that the time during which the transistor 52 conducts can be varied between the limits of the curves 60 and 61 by varying resistance $R_4$. It can also be seen that these curves 60 and 61 tend to converge at a point and at this point the condition exists that zero correction would be applied to the flow meter. Although only two curves are shown, it is understood that for each value of $R_4$, a separate curve similar to curves 60 and 61 and converging at the same point mentioned above will result.

Referring now to FIGURE 5, there is shown a method by which the zero position of the compensating system may be shifted. In this figure, $$\frac{R_1}{R_1+R_2}$$

again illustrates the position of the slider on resistance 45 and $$\frac{T_1}{T}$$

represents the ratio of time the gate is open to the time of the total cycle. If the resistances $R_3$ and $R_4$ are varied by equal increments in opposite directions, a family of curves 62, 63 will result with each curve 62, 63 representing the relationship between $$\frac{R_1}{R_1+R_2}$$

and $$\frac{T_1}{T}$$

for a particular incremental setting. As can be seen from the resulting curves, the time during which each of the transistors of the circuit of FIGURE 3 conduct can be moved from the curve 62 vertically upward to the curve 63. It is seen that the curves 62 and 63 of FIGURE 5 are substantially parallel to each other and that they cross the zero axis at different points.

Thus, one may select a desired compensation curve for use in the system of FIGURE 1 by first adjusting both resistances $R_3$ and $R_4$ to give the desired point of zero compensation then varying the slope of the compensation curve by maintaining resistance $R_4$ constant at the desired value and varying resistance $R_3$.

In order to better understand the above description it will be assumed that the system shown in FIGURE 1 is used to meter gas flow through the pipeline 10. In this case the pressure transducer 17 will include the resistance 45 and the slider thereon will be positioned by changes in pressure. Thus, the ratio of $R_1$ to $R_2$ will be related to pressure and the horizontal point of operation along the curves of FIGURE 4 will be determined accordingly. The temperature transducer 23 will include the resistance $R_4$ and the slider thereon will be positioned in response to temperature changes. This will fix the exact value of the ratio $$\frac{T_1}{T_2}$$

along the vertical line previously determined by the ratio of $R_1$ to $R_2$. From an inspection of the curves of FIGURE 4, it can be appreciated that as the pressure of the gas flow decreases the range of temperature correction also decreases. This results in a constant percentage of change in the total flow recorded for a given temperature change in the gas.

Of course, if a liquid flow is measured the above compensating system will not be required since most liquids are essentially non-compressible. In this case the ratio of $R_1$ to $R_2$ could be controlled by a different condition of the fluid such as specific gravity or BS and W content. Also, this ratio could be adjusted manually to a set value for the fluid being metered. The availability of the two corrections increases the flexibility of the system and permits it to be used to compensate different types of meters that measure many different fluids.

In addition to the above compensation it is possible to adjust the meter response without affecting the compensating system as shown in FIGURE 5. This permits the base or zero point of compensation to be adjusted to correct for inherent inaccuracies in the meter.

While but two embodiments of this invention have been described in detail, it is apparent that many additional modifications and changes may be made therein. It should be noted that both an electrical and mechanical system has been described in detail for compensating for the flow of various types of meters. The important feature of this invention is that the flow rate of the fluid is converted to a series of electrical pulses whose frequency is proportional to the flow rate of the fluid. These pulses are then supplied to a counting means through a switch means which opens and closes in response to changes in the condition for which it is desired to compensate the flow meter. Thus, only sufficient pulses are passed to the counter means to reflect the compensated volume of fluid which actually passes through the flow meter. In order to control the operation of the switches, either an electronic or mechanical means may be used.

Furthermore, while this invention has been described with relation to the compensation of a fluid flow meter, it can be readily appreciated that it could be utilized to telemeter any physical condition that may be converted to a series of related pulses. A source of pulses can be provided and the transmission of the pulses controlled by the above-described system in response to changes in the physical condition. Accordingly, this invention should not be limited to the details described herein but only to its broad spirit and scope.

I claim as my invention:

1. A compensating system for a fluid flow meter comprising: transducer means disposed adjacent to the flow meter to convert the fluid flow to a series of electrical pulses related thereto; a counting means for counting said electrical pulses; circuit means connected between the output of said transducer means and the input of said counting means for passing said electrical pulses to said counting means when in a closed position and for blocking the passage of said electrical pulses to said counting means when in an open position; control means for opening and closing said circuit means; for connecting the output of said transducer means to said counter when in a closed position and for disconnecting said output from said counter when in an open position; an additional transducer means disposed to monitor the fluid passing through said fluid meter and detect changes in a physical characteristic of the fluid; said additional transducer means being coupled to said control means to control the opening and closing of said circuit means in response to the changes in the physical condition of the fluid.

2. A compensating system for a fluid flow meter comprising: transducer means disposed adjacent to the flow meter to convert the fluid flow to a series of electrical pulses related thereto; circuit means for coupling said transducer to a counting means disposed to count said pulses, said circuit means including a switch means; an additional transducer means disposed to monitor the fluid passing through said fluid meter and detect changes in a physical characteristic of the fluid; said switch means including a multi-vibrator circuit having two states of conduction and control means for varying the two stable states of conduction while maintaining a relative constant time cycle; said multi-vibrator being coupled to a gate circuit to block the flow of pulses to the counting means during one state of conduction and pass the pulses during the other state of conduction; said additional transducer being coupled to said control means to control the length of said one state of conduction whereby said counting means displays a compensated total count of said pulses.

3. A compensating system for a fluid flow meter comprising: transducer means disposed adjacent to the flow meter to convert the fluid flow to a series of electrical pulses related thereto; a counting means; circuit means for passing said electrical output pulses from said transducer means to said counting means when in a first condition and for blocking the passage of said electrical pulses to said counting means when in a second condition; control circuit means having a substantially constant time cycle of operation for switching said circuit means between said first and second conditions; said control circuit means including a control means for varying the ratio of the time said circuit means is passing pulses to the total time cycle of said control circuit means; additional transducer means disposed to simultaneously monitor a plurality of conditions of the fluid passing through said meter and detect changes in said conditions; said additional transducers being coupled to said control means to vary the ratio of the time said circuit means is passing pulses to the total time cycle of said circuit control means in response to the changes in said conditions.

4. A compensating system for a fluid flow meter comprising: transducer means disposed adjacent to the flow meter to convert the fluid flow to a series of electrical pulses related thereto; a counting means; circuit means for passing said electrical output pulses from said transducer means to said counting means when in a first condition and for blocking the passage of said electrical pulses to said counting means when in a second condition; control circuit means having a substantially constant time cycle of operation for switching said circuit means between said first and second conditions; said control circuit means including a control means for varying the ratio of the time said circuit means is passing pulses to the total time cycle of said control circuit means, said control means having two separate controllable elements, one of said elements effecting a change in said ratio within a set operating range the other of said elements effecting a change in the limits of said operating range; transducer means disposed to simultaneously monitor a plurality of conditions of the fluid passing through said meter and detect changes therein, said monitoring transducers being coupled to said two separate controllable elements to control the changes in said ratio in response to changes in said condition.

5. A compensating system for a fluid flow meter comprising: transducer means disposed adjacent to the flow meter to convert the fluid flow to a series of electrical pulses related thereto; circuit means for coupling said transducer to a counting means disposed to count said pulses, said circuit means including a switch means; said switch means including a gate circuit connected between said transducer means and said counting means and a bi-stable multi-vibrator coupled to said gate circuit to control the opening and closing thereof; a control circuit coupled to said multivibrator for maintaining a substantially constant time cycle of operation for said multi-vibrator while varying the periods during which said multi-vibrator is in each of its two states of conduction; said control circuit including a source of trigger pulses for switching said multi-vibrator from one state of conduction to the other, and a resistance network for controlling said source of trigger pulses; said resistance network being formed by a potentiometer having a movable element and a pair of variable resistances, one of said variable resistances being connected between one end of said potentiometer and the output of one of the stages of said multi-vibrator, and the other of said variable resistances being connected between the other end of said potentiometer and the output of the other stage of said multivibrator, the movable element of said potentiometer being coupled to said source of trigger pulses; transducer means disposed to monitor a plurality of conditions of the fluid passing through said meter, said monitoring transducer means being coupled to control the value of said potentiometer and said variable resistances forming said resistance network.

6. A compensating system for a gas flow meter comprising: transducer means disposed adjacent to the flow meter to convert the gas flow to a series of electrical pulses related thereto; circuit means for coupling said transducer to a counting means disposed to count said pulses, said circuit means including a switch means; said switch means including a gate circuit connected between said transducer means and said counting means and a bi-stable multi-vibrator coupled to gate circuit to control the opening and closing thereof; a control circuit coupled to said multivibrator for maintaining a substantially constant time cycle of operation for said multivibrator while varying the periods during which said multivibrator is in each of its two states of conduction; said control circuit including a source of trigger pulses for switching said multivibrator from one state of conduction to the other, and a resistance network for controlling said source of trigger pulses; said resistance network being formed by a potentiometer having a movable element and a pair of variable resistances, one of said variable resistances being connected between one end of said potentiometer and the output of one of the stages of said multivibrator and the other of said variable resistances being connected between the other end of said potentiometer and the output of the other stage of said multivibrator, the movable element of said potentiometer being coupled to the source of trigger pulses; a pressure monitoring transducer disposed to monitor the pressure of the gas flowing through said meter, said pressure transducer being coupled to the movable element of said potentiometer to control the proportion of said resistance disposed in series with each of said variable resistances in response to said pressure; and, a temperature transducer disposed to monitor the temperature of the gas flowing through the meter and vary the resistance of at least one of said variable resistances in response to changes in the temperature.

7. A compensating system for a fluid flow meter comprising:

transducer means disposed adjacent to said flow meter to convert the fluid flow to a series of electrical pulses related thereto;

a counting means;

gating circuit means connected between the output of said transducer means and the input of said counting means for passing said electrical pulses to said counting means when in an open position and for blocking the passage of said electrical pulses to said counting means when in a closed position;

control circuit means having a substantially constant time cycle of operation for switching said gating circuit means between said first and said second positions; said control circuit means including a control means for varying the ratio of the time said gating circuit means is open to the total time cycle of operation of said control circuit means;

additional transducer means disposed to monitor the fluid passing through said flow meter and detect changes in a physical characteristic of said fluid; said additional transducer means being coupled to said control means to vary the ratio of the time said gating circuit means is open to the total time cycle of said control circuit means in response to changes in said physical condition.

8. The apparatus of claim 1 wherein: said control means is mechanically actuated and has a relatively constant time cycle of operation, said control means including an adjustable means for varying the time said circuit means is open during said constant time cycle of operation; said additional transducer means being coupled to said adjustable means whereby the time that said circuit means is open during said constant time cycle of operation is varied in response to changes in the monitored characteristic of the fluid.

References Cited by the Examiner

UNITED STATES PATENTS

| 2,623,389 | 12/52 | Van Oosterom | 73—231 |
| 2,767,582 | 10/56 | Bartelink | 73—231 |
| 2,859,619 | 11/58 | Fellows | 73—231 |
| 2,943,487 | 7/60 | Potter | 73—231 |
| 2,974,525 | 3/61 | Cole | 73—231 |
| 3,075,383 | 1/63 | Favill et al. | 73—231 |

RICHARD C. QUEISSER, *Primary Examiner.*

ROBERT L. EVANS, *Examiner.*

UNITED STATES PATENT OFFICE
CERTIFICATE OF CORRECTION

Patent No. 3,176,514

April 6, 1965

Kenneth W. Foster

It is hereby certified that error appears in the above numbered patent requiring correction and that the said Letters Patent should read as corrected below.

Column 2, line 52, for "betwen" read -- between --; column 7, lines 14 to 17, strike out "for connecting the output of said transducer means to said counter when in a closed position and for disconnecting said output from said counter when in an open position;"; column 8, line 12, for "condition" read -- conditions --.

Signed and sealed this 18th day of January 1966.

(SEAL)
Attest:

ERNEST W. SWIDER
Attesting Officer

EDWARD J. BRENNER
Commissioner of Patents